(No Model.)
E. P. HARRIS.
GAS GENERATOR.
No. 568,903. Patented Oct. 6, 1896.
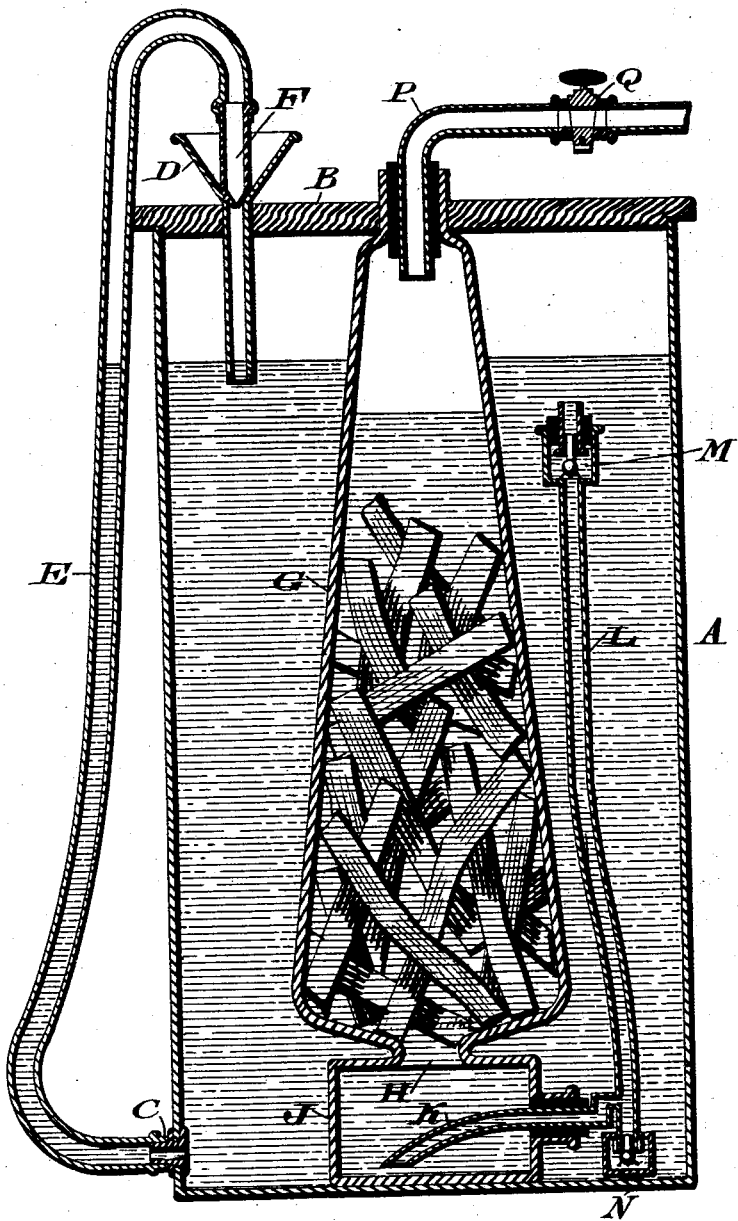
WITNESSES:
INVENTOR
Edward P. Harris
BY
ATTORNEY.

UNITED STATES PATENT OFFICE.

EDWARD P. HARRIS, OF CHESTER, PENNSYLVANIA, ASSIGNOR TO J. G. GRAY, ASSIGNEE OF QUEEN & COMPANY, INCORPORATED, OF PHILADELPHIA, PENNSYLVANIA.

GAS-GENERATOR.

SPECIFICATION forming part of Letters Patent No. 568,903, dated October 6, 1896.

Application filed October 5, 1895. Serial No. 564,706. (No model.)

*To all whom it may concern:*

Be it known that I, EDWARD P. HARRIS, a citizen of the United States, residing at Chester, in the county of Delaware, State of Pennsylvania, have invented a new and useful Improvement in Gas-Generators, which improvement is fully set forth in the following specification and accompanying drawing.

My invention consists of a generator for gas, such as hydrogen, chlorin, hydrosulfid, carbon dioxid, &c., the same embodying a jar adapted to contain an acid, a vessel adapted to contain a solid material, such as zinc, iron sulfid, &c., and a connection with said jar and vessel whereby the acid is permitted to flow into said vessel from a part of said jar different from that to which the acid returns when forced from said vessel, whereby the acid may be automatically supplied to said material as required for the generation, the gas may be effectively generated, and the spent acid may be discharged into the bottom of the jar originally containing the same, while fresh acid remains in the top of the jar ready to be automatically supplied to the vessel which contains the solid.

The figure represents a vertical section of a gas-generator embodying my invention.

Referring to the drawing, A designates a jar, which is provided with the cover B and the discharge-tube C, said cover having thereon the funnel D for filling the jar A, said cover B being preferably formed of wood.

E designates a piece of rubber tubing, one end of which is connected with the tube C, and the other end is connected with the glass tube F, which enters the funnel D.

Within the jar A is the vessel G, in which at the lower end thereof is the neck H, below which is the chamber J, the bottom wall of said vessel G being adapted to support the solids used in the gas-generator placed in the vessel, while the neck H, which extends from said wall, forms a communication between said vessel and chamber.

K designates a glass tube which opens into the chamber J and has its outer end connected with the glass tube L, whose ends are in communication with the jar A and are provided, respectively, with the valves M and N, both of which open into the jar A.

Connected with the top of the vessel G, which projects through the lid of the jar A, so as to be readily filled without a removal of said lid, is the pipe P, which is provided with a stop-cock Q, said pipe passing through the cover B.

The operation is as follows: The vessel G is supplied with zinc, iron sulfid, or other suitable material, and the jar A supplied with a suitable acid, the stop-cock Q being closed. When gas is required, said stop-cock is opened, and the acid then flows through the valve M into the tube L, and thence through the tube K into the vessel G, where it flows over or through the mass of material therein, thus generating a gas which escapes from the vessel into the pipe P, which directs it to the place of service. The valve N is so constructed that when the valve M is open said valve N permits little or no acid to pass through the same into the pipe K, owing to the pressure of the acid on said valve N from below. When the stop-cock is closed, the gas within the vessel G presses on the spent or partly-spent acid in the same, and forces it downwardly through said vessel to the pipe K, and from thence into the tube L. The valve M now closes and the valve N opens, whereby said acid is forced through the valve N into the jar A, it being seen that the acid is deposited in the bottom of the jar A. When the stop-cock is again opened, fresh acid enters the top of the tube L through the valve M, and thus the vessel G is supplied with fresh acid, insuring satisfactory working of the apparatus. Furthermore, the apparatus is automatic in its action of supplying the vessel G with acid as the same may be required for the generation of the gas.

The tubing E is employed for drawing off the spent acid, and when the same is not required for service the attached pipe F may be inserted in the funnel D, and thus held.

Having thus described my invention, what I claim as new, and desire to secure by Letters Patent, is—

1. A gas-generator consisting of a jar, a vessel within said jar, a chamber within said jar in communication with the base of said vessel, a tube in said jar having a valve at each end, a second tube leading from said first-mentioned tube into said chamber, and a pipe leading from said vessel to without said jar, said pipe having a cock thereon, said parts being combined substantialy as described.

2. The jar A having the cover B, the vessel G and chamber J within said jar having the communicating neck H, the tube L having the valves M and N working as described at its opposite ends, the tube K leading from said tube L into said chamber J, and the pipe leading from said vessel G to without said jar, said parts being combined substantially as described.

3. In a gas-generator the jar A with inlet-funnel D in the cover thereof, the vessel G and chamber J with communicating neck H, the tube L having a valve at each end communicating with said jar A, the tube K leading from said tube L into the chamber J, the pipe P leading from the vessel G to without the jar, and provided with the cock Q, and the flexible pipe E connected to the lower part of the jar A, and having a connected pipe F adapted to be inserted in said funnel D, said parts being combined substantially as described.

EDWARD P. HARRIS.

Witnesses:
JOHN A. WIEDERSHEIM,
R. H. GRAESER.